United States Patent
Pierce et al.

(10) Patent No.: US 8,396,069 B1
(45) Date of Patent: *Mar. 12, 2013

(54) USING DOMAIN NAME SERVER RESPONSE AND INTERNET PROTOCOL VERSION 6 TO CONSERVE INTERNET PROTOCOL VERSION 4 ADDRESSES

(75) Inventors: Robert Jolin Pierce, Castle Rock, CO (US); John H. Bennett, III, Lawrence, KS (US); Dale E. Winn, Adrian, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/538,369

(22) Filed: Jun. 29, 2012

Related U.S. Application Data

(63) Continuation of application No. 12/275,820, filed on Nov. 21, 2008, now Pat. No. 8,243,740.

(51) Int. Cl.
*H04W 4/00* (2009.01)
*H04L 12/28* (2006.01)
*G06F 15/16* (2006.01)

(52) U.S. Cl. ............... 370/395.5; 370/338; 370/393; 709/230; 709/245

(58) Field of Classification Search .................. None
See application file for complete search history.

(56) References Cited

U.S. PATENT DOCUMENTS

| | | | |
|---|---|---|---|
| 7,415,536 B2 * | 8/2008 | Nakazawa | 709/245 |
| 2003/0070067 A1 * | 4/2003 | Saito | 713/150 |
| 2006/0259641 A1 * | 11/2006 | Kim et al. | 709/245 |
| 2010/0005158 A1 * | 1/2010 | Savolainen | 709/220 |

* cited by examiner

*Primary Examiner* — Faruk Hamza
*Assistant Examiner* — Thinh Tran

(57) ABSTRACT

Communication to a target device using IP is provided. An IPv6 address is registered. An AAAA-record DNS lookup is performed and an A-record DNS lookup is performed, both using the IPv6 network. A response related to the AAAA-record DNS lookup is received and a response to the A-record DNS lookup is received. If a valid IPv6 address is contained in the AAAA-record response, communication uses IPv6. If no valid IPv6 address is contained in the AAAA-record response, an IPv4 address is registered and communication uses IPv4.

14 Claims, 7 Drawing Sheets

USING DOMAIN NAME SERVER RESPONSE AND INTERNET PROTOCOL VERSION 6 TO CONSERVE INTERNET PROTOCOL VERSION 4 ADDRESSES

CROSS-REFERENCE TO RELATED APPLICATIONS

This application is a continuation of U.S. patent application Ser. No. 12/275,820, filed Nov. 21, 2008, entitled "Using Domain Name Server Response And Internet Protocol Version 6 to Conserve Internet Protocol Version 4 Addresses," which is herein incorporated by reference.

BACKGROUND

Computational devices, often called hosts, on the Internet use the Internet Protocol (IP) to route data. Most of these hosts use IPv4, which has an address space that is rapidly becoming exhausted. A method of conserving addresses in the IPv4 address space could help alleviate the shortage, allowing a continuing increase in the number of hosts on the Internet. Hosts using IPv6 addresses most of the time could release IPv4 addresses, freeing them for use by other hosts, without exhausting the IPv6 address space.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter.

Embodiments of the present invention relate to communicating to a target device on an IP network by using DNS to determine IPv4 and IPv6 network addresses of the host. In some embodiments, Mobile IP is used to register IPv4 and IPv6 network addresses. In other embodiments DHCP is used to register IPv4 and IPv6 network addresses.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Figure 1:
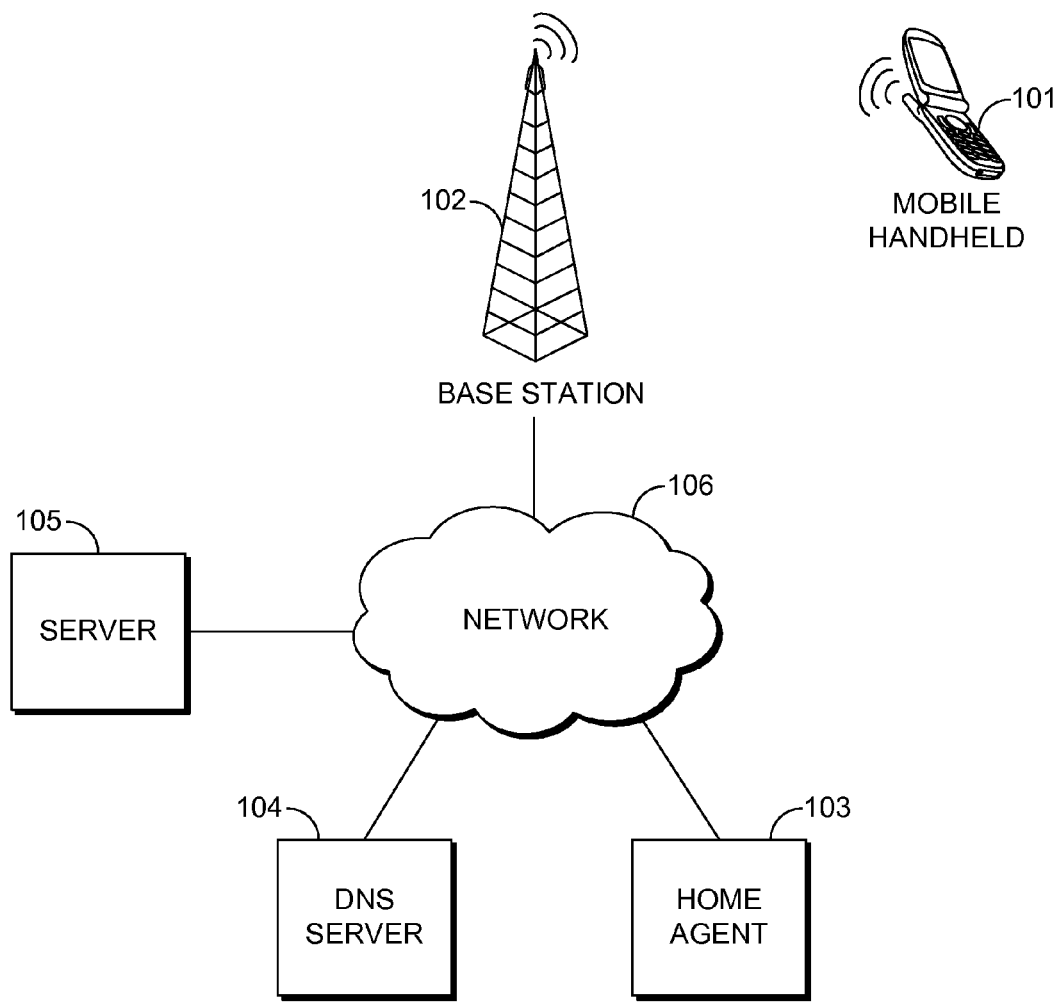
FIG. 1 depicts a block diagram of an exemplary network environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| DNS | Domain Name System |
| IPv4 | Internet Protocol version 4 |
| IPv6 | Internet Protocol version 6 |
| A Lookup | IPv4 DNS request/reply |
| AAAA Lookup | IPv6 DNS request/reply |
| DHCP | Dynamic Host Configuration Protocol |
| PC | Personal Computer |

Embodiments of the present invention are directed to leveraging the Domain Name System (DNS) to conserve Internet Protocol version 4 (IPv4) network addresses. IPv4 is the Internet standard that is commonly used to address packets between computation devices, called hosts, on the Internet. Such communication often occurs between two such hosts on a network, a source device and a target device. However, IPv4 has an address space that is being rapidly exhausted by the growing number of hosts on the Internet. This address space is expected to be exhausted as early as late 2009. Therefore, other solutions are needed to ensure unobstructed growth in the numbers of devices connected to the Internet.

One such solution is Internet Protocol version 6 (IPv6), which has a tremendously large address space. However, transition to IPv6 requires routers, the hardware forming the pathways of the Internet, to be upgraded and/or replaced. This has led to a slow transition to IPv6. It is also expected that for some time, many hosts will have both IPv4 and IPv6 capabilities.

When hosts, such as laptops, home computers, and handheld devices (e.g., smart phones) join the network, the first step is often acquiring a network address, either IPv4 or IPv6. If the host is a wired host (e.g., a home computer) or wireless host expected to use only a single base-station (e.g., a laptop attaching to a home access point), then Dynamic Host Configuration Protocol (DHCP) is commonly used to acquire a network address. The host, upon connecting to the network, sends out a DHCP request for an address. The DHCP server on the local network responds with a valid address. Addresses acquired this way often have an expiration time, before which the host must renew the address request in order to be able to continuing using the address. Hosts can also explicitly release addresses, for example before powering down. In this way, only hosts that are using the network will hold addresses.

If a wireless host connected to the network is expected to travel between base-stations (e.g., a mobile phone), then Mobile IP is commonly used to acquire a network address. The host, upon connecting to the network, will request an address from a predetermined Home Agent. The Home Agent then handles the routing of information to the host, potentially through a Foreign Agent on a different network. Addresses acquired through Mobile IP often expire after a certain time, ensuring that if mobile hosts leave the network without releasing the address, the address is still returned to the pool of available addresses.

According to some embodiments of the present invention, IPv4 addresses can be conserved if IPv4 addresses are only requested when they are required to communicate with a host not having an IPv6 address. DNS can be used to determine whether the target of a communication session has an IPv6 address. DNS is used by hosts to map human readable names (e.g., domain.com) to Internet Protocol addresses (e.g., 216.34.94.184). In order for two hosts on an IP-based network to communicate, the IP addresses of each host must be known. However, humans have difficulty remembering IP-formatted addresses; therefore, human-readable domain names are used instead. Once a domain name is entered, the host then sends an address lookup query to a domain name server. The domain name server will either return the IP address of the host, return the address of a domain name server responsible for addresses relating to the domain in question, or return a failure message. There is a lookup query message relating to IPv4 addresses called an A-record DNS lookup and a lookup query message relating to IPv6 addresses called an AAAA-record DNS lookup. Either type of query can be sent over an IPv6 network.

A first aspect is directed to computer-readable media storing computer-executable instructions for performing a method of communicating with a target device on a network. An IPv6 address for the target device is determined. An IPv4 address for the target device is determined. When the IPv6 address for the target device is a valid IPv6 address, an IPv6 network is used to communicate with the target device. When the IPv6 address for the target device is not a valid IPv6 address, then registration for an IPv4 address is performed, where determining the IPv4 address and registering for the IPv4 address occur simultaneously, and the target device is communicated with using an IPv4 network.

A second aspect is directed to computer-readable media storing computer-executable instructions for performing a method of communicating with a target device on a network. Internet Protocol version 6 (IPv6) is utilized to determine a protocol for use in communicating with the target device, where determining the protocol for use in communicating with the target device includes determining an IPv6 address of the target device and determining an IPv4 address of the target device. Determining the IPv6 address and determining the IPv4 address occur simultaneously. An indication is received that indicates the protocol for use in communicating with the target device. When the indication indicates the target device can communicate via IPv6, then the target device is communicated with using IPv6. When the indication indicates the target device cannot communicate via IPv6, then the target device is communicating with using Internet Protocol version 4 (IPv4). According to some embodiments of the invention, utilizing IPv6 to determine a protocol for use in communication can include performing multiple types of DNS lookups. Receiving an indication indicating the protocol can include receiving DNS lookup responses to the multiple types of lookups. According to other embodiments of the invention, utilizing IPv6 to determine a protocol for use in communication could involve attempting to communicate to the target device using IPv6 and receiving an indication indicating a protocol could be receiving a response from the target device. Those skilled in the art will recognize that there are other ways in which IPv6 could be utilized to determine a protocol for use in communication with the target device and in which an indication could be received.

Having described an overview of some embodiments of the present invention, an exemplary operating environment in which embodiments of the present invention may be implemented is described below in order to provide a general context for various aspects of the present invention. Referring initially to FIG. 1 in particular, a typical network topology is depicted in which a mobile handheld device 101 connects to a network 106 through a base station 102. A host on a network is any computational device connected to the network, including web servers, mail servers, DNS servers, mobile handhelds, personal computers, Mobile IP Home Agents, and DHCP servers. Those skilled in the art will recognize that any number of wireless technologies could be used to facilitate communication between the mobile handheld 101 and the base station 102, including: IEEE 802.11, IEEE 802.16, and EVDO. The base station 102 is connected to the network 106, which may be an internal private network, or a connection to the Internet via a wired link. According to some embodiments of the invention, the base station 102 and the network 106 could be connected by a wireless link. Also attached to the network are a Mobile IP Home Agent 103, a DNS server 104, and a Server 105. The Home Agent 103 can be used to allocate IPv4 or IPv6 addresses to the mobile handheld 101 as needed. The DNS Server 104 can respond to any DNS queries, either A-record or AAAA-record made by hosts connected to the network 106. According to some embodiments of the present invention, the DNS server can either use only an IPv6 address, only an IPv4 address, or both an IPv4 and IPv6 address simultaneously. The server 105 could be a web server or a mail server or any other server with which the mobile handheld 101 desires to communicate. The server 105 could have only an IPv4 address, only an IPv6 address, or both an IPv4 and IPv6 address.

Figure 2:
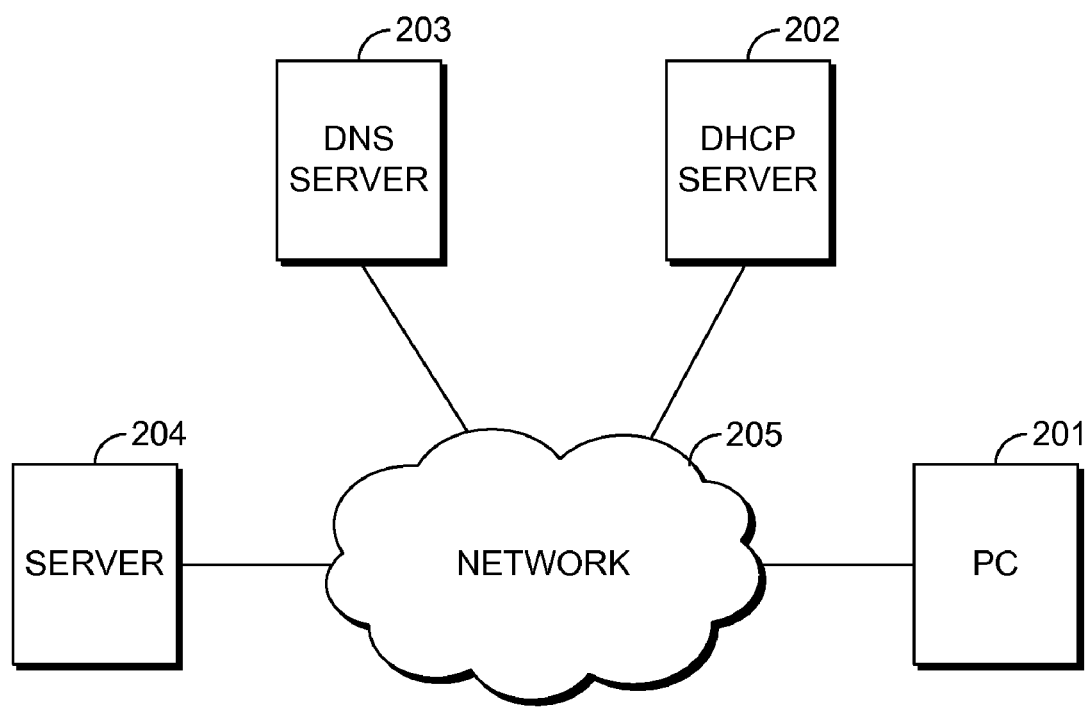
FIG. 2 depicts a block diagram of an exemplary network environment suitable for use in implementing the present invention.

Referring now to FIG. 2, according to another embodiment of the invention, another typical network topology is depicted that is suitable for the support of wired hosts. This topology also includes a server 204 connected to a network 205. Those skilled in the art will recognize that the server 204 could provide one or more of a number of services, including web, email, and data streaming. A DNS server 203 is also attached to the network 205 to answer domain name lookup queries. A personal computer (PC) 201 is attached to the network. This PC may need to register for an IP address for communication with the server. The PC 201 has a wired connection to the network 205. Those skilled in the art will recognize that a wireless connection could also be used to connect the PC 201 to the network 205. A DHCP server 202 is connected to the network 205 to handle providing IP addresses to hosts. The DHCP server could handle IPv6 and IPv4 addresses. For example, upon initiating a communication session, PC 201 could send a request for an IPv4 address onto the network

205. DHCP server 202 could respond with a valid IPv4 addresses, which PC 201 would then use for the communication session.

Figure 3:
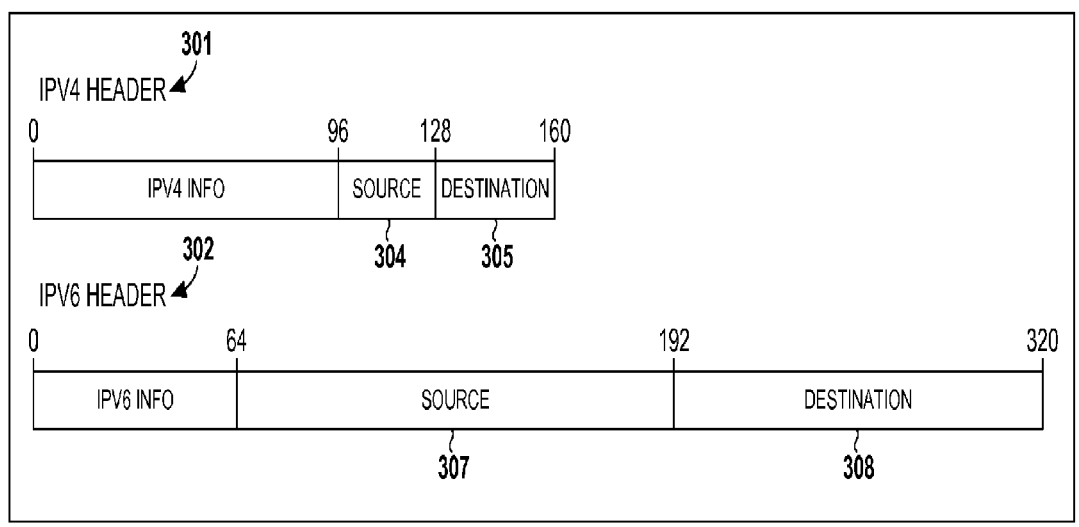
FIG. 3 depicts a block diagram of IPv4 and IPv6 packet headers in accordance with an embodiment of the present invention.

Turning now to FIG. 3, headers for both IPv4 301 and IPv6 302 are depicted. IPv4 uses 32-bit addresses for each host on the network (e.g., each source address 304 and destination address 305 is 32 bits long). A 32-bit address space yields $2^{32}$ or approximately 4 billion addresses. However, due to inefficiencies with allocation strategies and the growing number of hosts requiring IPv4 addresses, this address space is expected to be exhausted soon. IPv6 uses 128-bit addresses for each host on the network (e.g., each source address 307 and destination address 308 is 128 bits long). The larger IPv6 address space has room for about $3.4 \times 10^{38}$ unique addresses, many orders of magnitude more addresses than the IPv4 address space.

Figure 4:
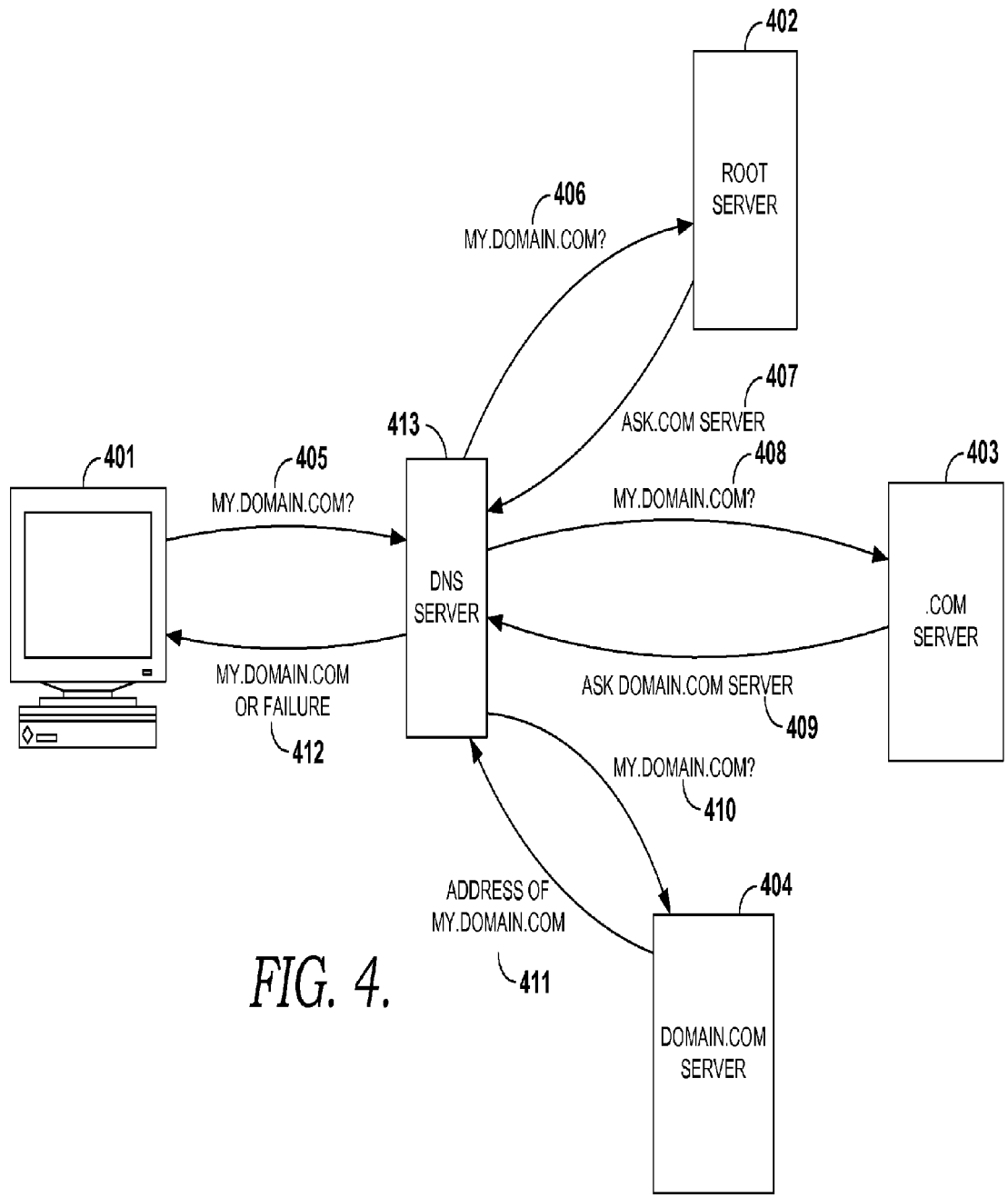
FIG. 4 depicts a block diagram showing an exemplary DNS lookup transaction in accordance with an embodiment of the present invention.

Referring now to FIG. 4, an exemplary DNS request is considered. A host 401 wishes to initiate communication with another host on the network that has the domain name MY.DOMAIN.COM. Those skilled in the art will recognize that host 401 could a number of different types of computing devices including: a mobile handheld device, a laptop, and a wired PC. DNS is a hierarchical system, where the broadest domain is the right-most name in the full domain name. Consider the domain name MY.DOMAIN.COM. There is the overarching domain containing all domains, called the root domain (e.g., the root domain contains the broad domains .com, .net, .org, etc.) There is no symbol for the root domain. The next broadest domain in MY.DOMAIN.COM is "COM." There are many subdomains within the COM domain. DOMAIN is one of the subdomains of COM. Finally MY is either a subdomain of DOMAIN or MY refers to an actual computer in the DOMAIN domain. There are a number of DNS servers on the network: DNS server 413 is the local DNS server that hosts 401 uses for DNS lookup requests. Root server 402 handles all requests for root domain requests. .COM server 403 handles all requests for "COM" domains. DOMAIN.COM server 404 handles all requests for DOMAIN.COM subdomains. When host 401 initiates a DNS lookup for MY.DOMAIN.COM, it sends an A-record lookup message or an AAAA-record lookup message 405 to DNS server 413, for an IPv4 address or an IPv6 address, respectively. If DNS server 413 does not know the address of MY.DOMAIN.COM, it forwards the request 406 to the root server 402. The root server responds 407 with the address of the COM server 403. The DNS server 413 then forwards the address request 408 to the COM server 403. The COM server 403 responds 409 with the address of the DOMAIN.COM server 404. The DNS server 413 forwards the address request 410 to the DOMAIN.COM server 404. The DOMAIN.COM server 404 replies with the address of MY.DOMAIN.COM 411. The DNS server 413 then replies 412 to host 401 with the address. If at any step, an address of another DNS server, or the actual address of the desired host cannot be found, a failure message is returned to DNS server 413, which is then forwarded to the requesting host 401.

Figure 5:
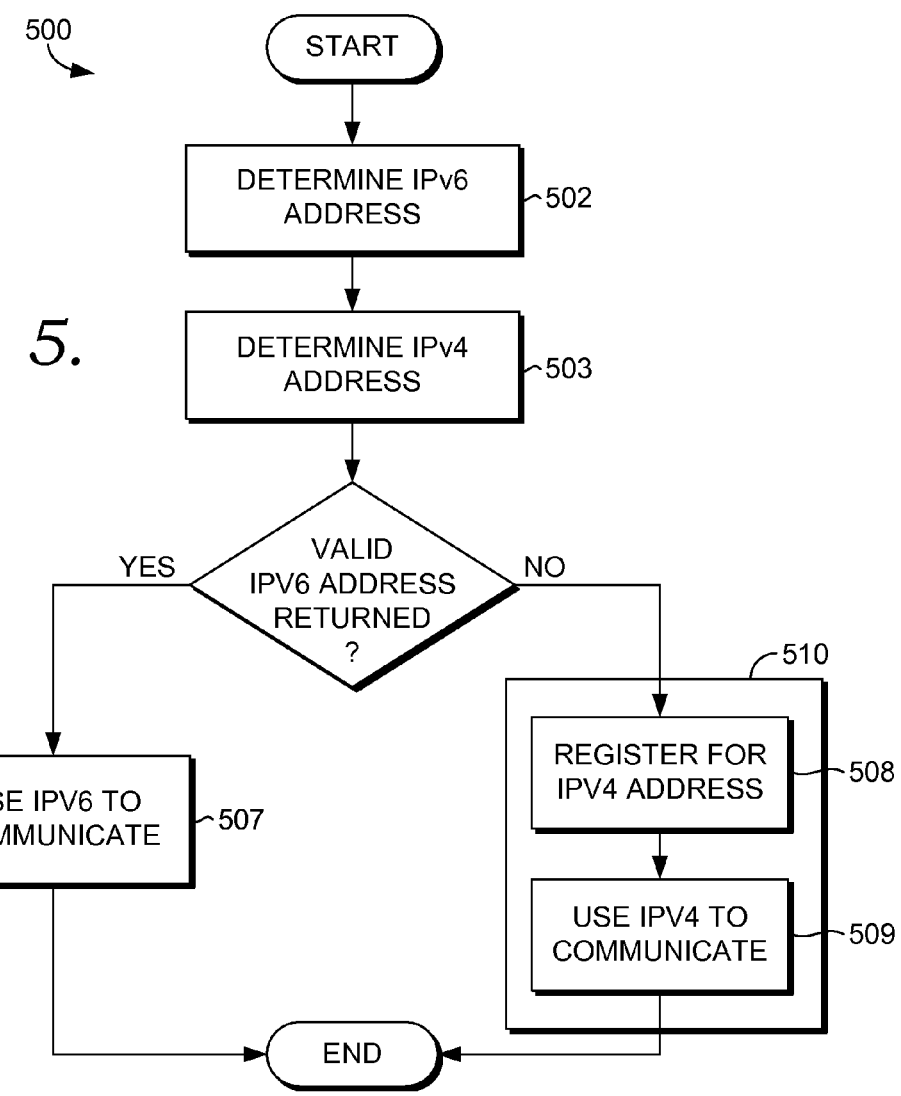
FIG. 5 illustrates a flow diagram showing a method for performing communication to a target device in accordance with an embodiment of the present invention.

Turning now to FIG. 5, a flow diagram depicting a method of communicating with a host on a network 500 is given. An IPv6 address for the host is determined, as shown at block 502. According to an embodiment of the invention, an AAAA-record DNS lookup is performed, requesting an IPv6 address for the computing device that is to be communicated with by the host. A response relating to the AAAA-record DNS lookup is received. By way of example, the response could include a variety of different messages including: a positive message with a valid IPv6 address for the target of the host's communication and a negative message with no valid IPv6 address for the target of the host's communication.

An IPv4 address for the host is determined, as shown at block 503. According to some embodiments of the invention, an A-record DNS lookup is performed, requesting an IPv4 address for the computing device that is to be communicated with by the host. A response relating to the A-record DNS lookup is received. This response could include a positive message with a valid IPv4 address for the target of the host's communication. Those skilled in the art will recognize that it is possible to receive both a valid IPv4 and a valid IPv6 address for the same communication target. According to one embodiment of the invention, both the determination of the IPv6 address, as shown at block 502, and the determination of the IPv4 address, as shown at block 503, occur virtually simultaneously. According to other embodiments of the invention, the determination of the IPv4 address, as shown at block 503 could be performed before the determination of the IPv6 address, as shown at block 502

If a valid IPv6 address is returned, then IPv6 is used to communicate, as shown at block 507. According to some embodiments of the invention, IPv6 is used in the case where both an IPv6 address and an IPv4 address are returned. If, however, no valid IPv6 address is returned, then IPv4 communication is initiated, as shown in the steps contained in block 510. The host registers for an IPv4 address, as shown at block 508. According to some embodiments of the invention, Mobile IP is used to register for the IPv4 address. According to other embodiments of the invention, a dynamic IPv4 address is acquired through the use of DHCP. IPv4 is used to communicate, as shown in block 509. According to an embodiment of the invention, once the communication session is complete, the host releases the mobile IPv4 address or the dynamic IPv4 address acquired through DHCP.

Figure 6:
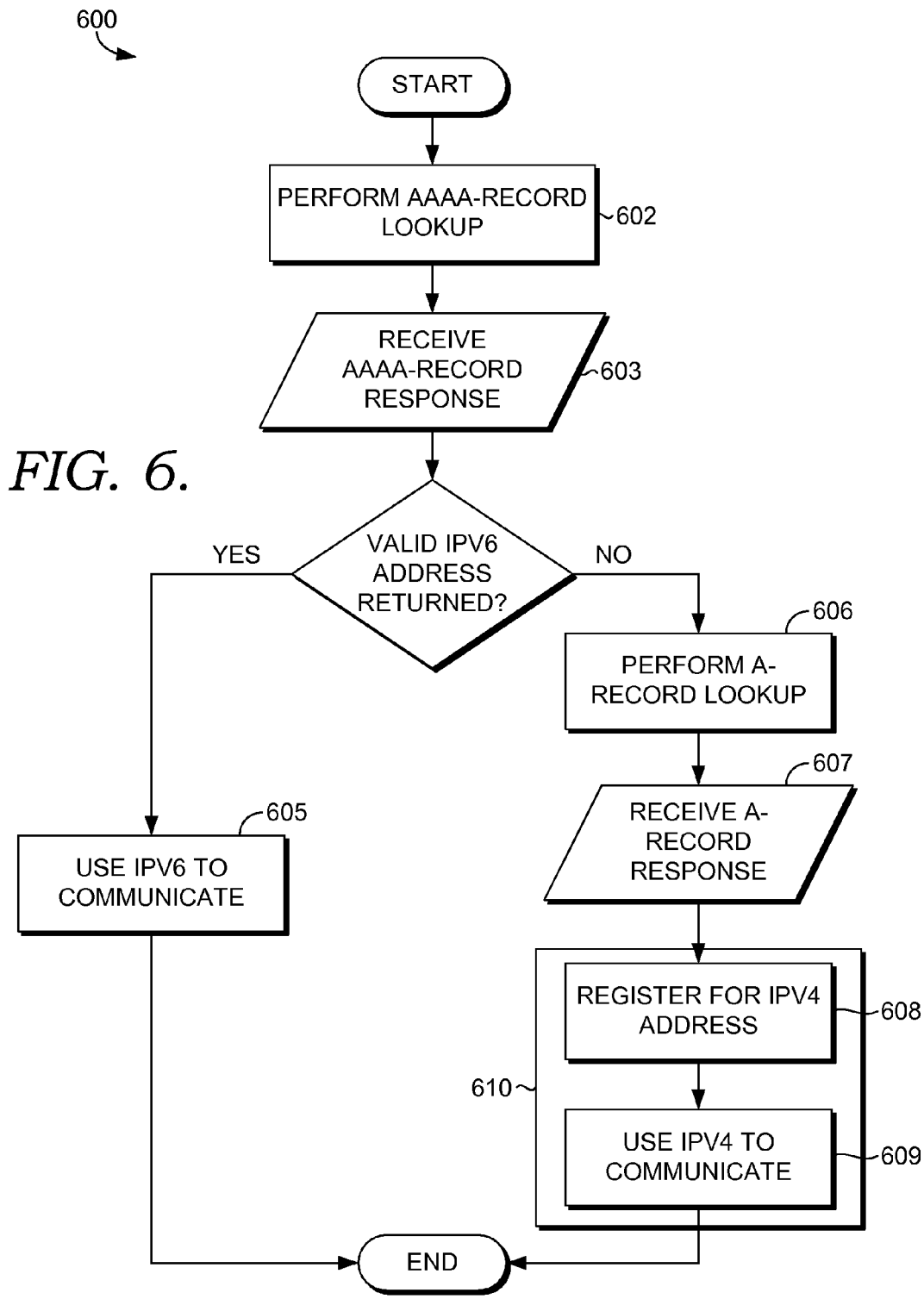
FIG. 6 illustrates a flow diagram showing a method for performing communication to a target device in accordance with an embodiment of the present invention.

Turning now to FIG. 6, a flow diagram depicting a method of communicating with a host on a network 600 is depicted. An AAAA-record DNS lookup is performed, as shown at block 602. A response is received, corresponding to the AAAA-record DNS lookup, as shown at block 603. According to some embodiments of the present invention, the response could be positive, including a valid IPv6 address for the target of the communication. If the response did contain a valid IPv6 address for the target of the communication, then IPv6 is used to communicate, as shown at block 605.

If no valid IPv6 address is returned, an A-record DNS lookup is performed, as shown at block 606. The A-record DNS lookup is performed over the IPv6 network. A response is received related to the A-record DNS lookup, as shown at block 607. IPv4 communication is initiated, as shown in block 610, which includes registering for an IPv4 address, as shown in block 608 and using IPv4 to communicate, as shown in block 609. According to some embodiments of the invention, the registering for an IPv4 address is performed using Mobile IP. According to other embodiments of the invention, the registering for an IPv4 address is performed using DHCP. Those skilled in the art will recognize that the registering for an IPv4 address could be moved to be performed simultaneously with the performing of an A-record DNS lookup. This speeds up registration time, and reduces the number of steps required to complete authentication. Additionally, according to some embodiments of the invention, once the communication is finished, the IPv4 address is released.

Figure 7:
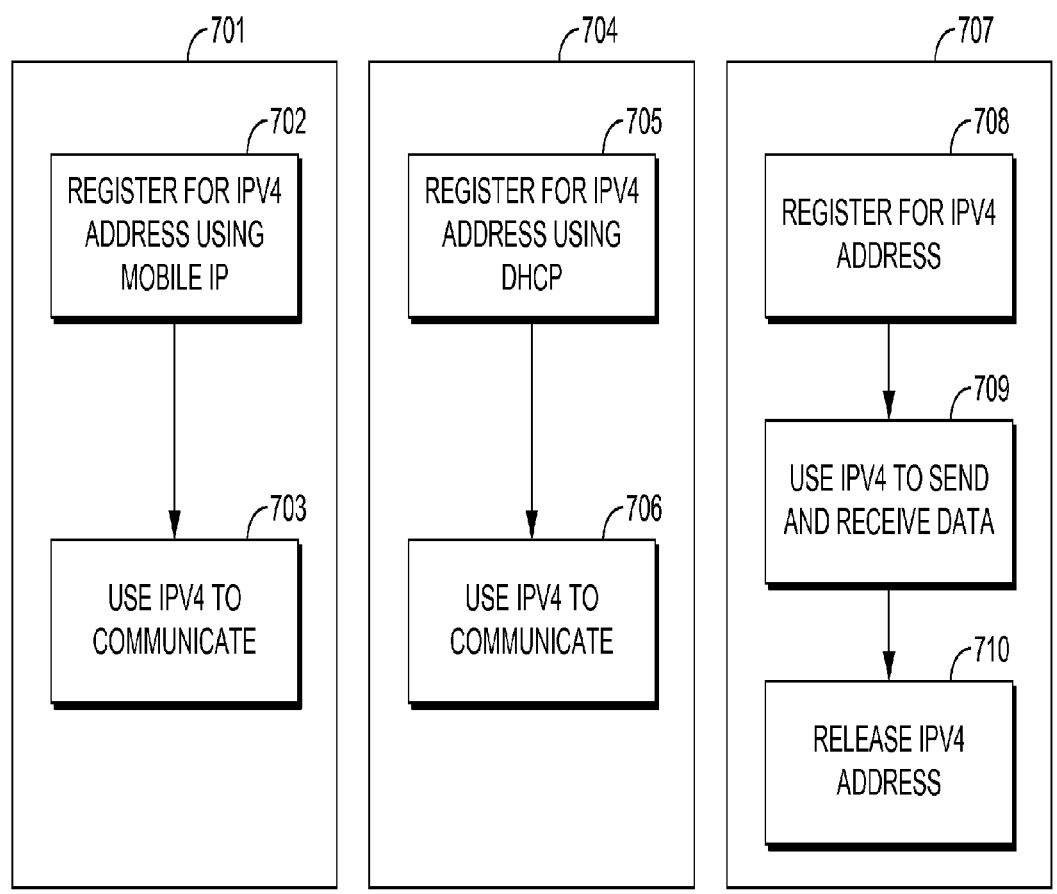
FIG. 7 illustrates a flow diagram showing various methods of communicating using IPv4 in accordance with an embodiment of the present invention.

Turning now to FIG. 7, block diagrams explicating exemplary steps in communicating using IPv4, as shown in block 510 of FIG. 5 and block 610 of FIG. 6, are given. Those skilled in the art will recognize that there are many other ways in which IPv4 communication could be performed in accordance with the present invention. Block 701 shows a method making use of Mobile IP, wherein an IPv4 address is registered using Mobile IP, as shown in block 702. Communication is performed using the IPv4 address, as shown in block 703. Block 704 shows a method making use of DHCP, wherein an IPv4 address is registered using DHCP, as shown in block 705. Communication is performed using the IPv4 address, as shown in block 706. Block 707 shows a method of communicating with IPv4, wherein an IPv4 address is registered, as shown in block 708. Those skilled in the art will recognize that there are a number of ways for an IPv4 address to be registered, including using Mobile IP and using DHCP. IPv4 is used for communicating, as shown in block 709. The registered IPv4 address is released after the communication session has terminated, as shown in block 710. Those skilled in the art will recognize the release of the IPv4 address can be accomplished in a number of ways, including: using Mobile IP, using DHCP, and allowing the address registration to timeout.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more nontransitory computer-readable media storing computer-executable instructions for performing a method of communicating with a target device on a network, the method comprising:
   determining an Internet Protocol version 6 (IPv6) address for the target device;
   determining an Internet Protocol version 4 (IPv4) address for the target device;
   when the IPv6 address for the target device is a valid IPv6 address, communicating with the target device using an IPv6 network; and
   when the IPv6 address for the target device is not a valid IPv6 address,
      A) registering for an IPv4 address, wherein determining the IPv4 address and registering for the IPv4 address occur simultaneously, and wherein determining the IPv4 address includes performing an A-record Domain Name Service (DNS) lookup, and
      B) communicating with the target device using an IPv4 network.

2. The media of claim 1, wherein determining the IPv6 address for the target device includes:
   performing an AAAA-record DNS lookup over the IPv6 network; and receiving a response related to the AAAA-record DNS lookup.

3. The media of claim 2, wherein receiving the response related to the AAAA-record DNS lookup includes receiving a positive response with a valid IPv6 address for the target device.

4. The media of claim 2, wherein receiving the response related to the AAAA-record DNS lookup includes receiving a negative response with no valid IPv6 address for the target device.

5. The media of claim 1, wherein determining the IPv4 address for the target device includes:
   performing the A-record DNS lookup over the IPv6 network; and
   receiving a response related to the A-record DNS lookup.

6. The media of claim 5, wherein receiving the response related to the A-record DNS lookup includes receiving a positive response with a valid IPv4 address for the target device.

7. The media of claim 1, wherein communicating with the target device using the IPv4 network includes releasing the IPv4 address when communication is terminated.

8. The media of claim 1, wherein registering for the IPv4 address includes requesting the mobile IPv4 address from a mobile IP Home Agent.

9. The media of claim 1, wherein registering for the IPv4 address includes using DHCP to obtain the IPv4 address.

10. One or more nontransitory computer-readable media storing computer-executable instructions for performing a method of communicating with a target device on a network, the method comprising:
    utilizing Internet Protocol version 6 (IPv6) to determine a protocol for use in communicating with the target device, wherein determining the protocol for use in communicating with the target device includes determining an IPv6 address of the target device and determining an Internet Protocol version 4 (IPv4) address of the target device;
    receiving an indication that indicates the protocol for use in communicating with the target device;
    when said indication indicates the target device can communicate via IPv6, then communicating with the target device using IPv6; and
    when said indication indicates the target device cannot communicate via IPv6, then registering for an IPv4 address and communicating with the target device using IPv4, wherein registering for the IPv4 address and determining the IPv4 address occur simultaneously, and wherein determining the IPv4 address includes performing an A-record Domain Name Service (DNS) lookup.

11. The media of claim 10, wherein utilizing IPv6 to determine the protocol for use in communication includes:
    performing an AAAA-record DNS lookup over the IPv6 network to determine the IPv6 address of the target device; and
    performing the A-record DNS lookup over the IPv6 network to determine the IPv4 address of the target device.

12. The media of claim 11, wherein the receiving an indication that indicates the protocol includes:
    receiving a response related to the AAAA-record DNS lookup;
    receiving a response related to the A-record DNS lookup;
    when the AAAA-record contains a valid IPv6 address for the target device, determining the indication to indicate the target device can use IPv6; and
    when the AAAA-record does not contain a valid IPv6 address for the target device, determining the indication to indicate the target device cannot use IPv6.

13. The media of claim 10, wherein communicating with the target device using IPv4 includes registering for an IPv4 address using mobile IP.

14. The media of claim 10, wherein communicating with the target device using IPv4 includes registering for an IPv4 address using Dynamic Host Configuration Protocol (DHCP).

\* \* \* \* \*